United States Patent Office 3,840,616
Patented Oct. 8, 1974

3,840,616
ADJUVANT IN COUPLING OF POLYISOPRENE-ALKALI METAL TERMINATED POLYMERS
Earl Clark and Ralph C. Farrar, Bartlesville, Okla., assignors to Phillips Petroleum Company, Bartlesville, Okla.
No Drawing. Filed Oct. 12, 1972, Ser. No. 296,849
Int. Cl. C08d 5/02; C08f 19/08, 27/04
U.S. Cl. 260—827
17 Claims

ABSTRACT OF THE DISCLOSURE

Coupling of polyisoprene-alkali metal terminated polymer chains with silicon-based coupling agents is significantly improved by employing a small amount of butadiene added just prior to addition of the coupling agent.

FIELD OF THE INVENTION

The invention relates to methods of coupling polyisoprene alkali metal-terminated polymer units.

BACKGROUND OF THE INVENTION

Polymerization initiated by organolithium compounds results in alkali metal-terminated polymer chains, i.e., polymer-lithium. The addition of multifunctional compounds reactive with carbon-alkali metal bonds, e.g., silicon tetrachloride, to the polymer-alkali metal forms coupled dichain, or branched trichain, tetrachain, or polychain polymers.

However, in joining or coupling polymers containing isoprene units as the final polymer-lithium entity, such silicon-based coupling agents, while desirable from availability, ease of handling, and use, have exhibited difficulties. In fact, polyisoprene-alkali metal is quite poorly coupled, and does not provide adequately branched polyisoprene when the conventional silicon-based coupling agents are employed. The result has been only partial coupling, and attempts to obtain the desired, highly branched polymer have not met with success.

OBJECTS OF THE INVENTION

It is an object of the invention to improve the coupling of polyisoprene-alkali metal with silicon-based polyfunctional coupling agents.

Other aspects, objects, and the several advantages of our invention will be apparent to one skilled in the art from the following disclosure and our appended claims.

BRIEF SUMMARY OF THE INVENTION

In the coupling of alkali metal-terminated polyisoprene with silicon-based coupling agents, a small amount of butadiene is employed to act as a coupling adjuvant. Employment of butadiene as a coupling adjuvant permits coupling of the polyisoprene units effectively and efficiently to produce desired highly branched coupled polyisoprenes, tribranched, quadribranched, hexabranched, or as desired according to the functionality of the coupling agent employed.

DETAILED DESCRIPTION OF THE INVENTION

In order to prepare radially branched polyisoprenes, using organoalkali metal initiators and silicon-based coupling agents, we have discovered that it is necessary to use small amounts of butadiene added after the polymerization step and prior to addition of the coupling agent.

POLYMERIZATION SYSTEMS

Our invention is applicable to the polymerization of monomers which are polymerizable with alkali metal initiators, wherein polyisoprene is the only monomer polymerized, or is the final monomer polymerized in the use of copolymerization systems such as by sequential addition of monomers, and the like.

The monomers which can be employed in the process according to our invention are those known to polymerize with alkali metal initiator systems. Such monomers include the particular useful polymerizable conjugated dienes, polymerizable monovinyl-substituted aromatic compounds, any one or more of either or of each, alone, by sequential addition, or as admixture, so as to produce homopolymers, copolymers of any two or more, and either random or block copolymers, so long as the living polymer contains as a final unit of polyisoprene unit.

Thus, in general, we term the polymers to which our invention can be applied, polymers of isoprene or polyisoprenes. The living polymer resulting from the alkali metal-initiated polymerization system to which our invention is applied thus can be termed a polyisoprenyl-alkali metal or polyisoprene-alkali metal.

The monomer units adjacent to the isoprene unit and on along the chain can possess any of the monomer units as described above. Presently most commonly used are the conjugated dienes of 4 to 12, preferred for commercial availability of 4 to 8, carbon atoms per molecule, and the monovinyl-substituted aromatic compounds of 8 to 20, preferred for availability of 8 to 12 carbon atoms per molecule. Suitable monomers include the important isoprene as well as 1,3-butadiene, styrene, 2,3-dimethyl-1,3-butadiene, piperylene, 3-butyl-1,3-octadiene, 2-phenyl-1,3-butadiene, 1-vinylnaphthalene, 3-methylstyrene, 4-cyclohexylstyrene, 4-dodecylstyrene, 2-ethyl-4-benzylstyrene, 4-tert-butylstyrene, 4-isopropylstyrene, and the like.

ORGANOALKALI METAL INITIATORS

The process of our invention is applicable to any of the alkali metal based initiators known in the art to polymerize the polymerizable monomers we have described above. The term "alkali metal initiator" is employed in the broad sense to include any of the initiators which include one or more lithium or other alkali metal atoms, preferably with one or more organic moieties, whether as organolithium compounds, organolithium adducts, multilithium initiators, and other more or less descriptive terms. For lithium can be substituted sodium, potassium, rubidium, or cesium, although lithium presently is preferred for most efficient polymerization of monomers in most instances.

The organoalkali metal initiators which presently are most frequently employed in polymerization of the polymerizable monomers described can be represented by $RM_x$ where M is any of the alkali metals described, but preferably lithium, and R represents a hydrocarbyl radical which can be alkyl, cycloalkyl, or aryl, or various combination thereof, and can contain any number of carbon atoms desired depending on convenience and availability. Most frequently employed are those of from 1 to 20 carbon atoms, such as methyllithium, presently preferred n-butyllithium, as well as cyclohexyllithium, 4-cyclohexylbutyllithium, isopropyllithium, 4-phenylbutyllithium, 1,20-dilithioeicosane, dilithionaphthalene, and any of these and the like with any of the other alkali metals, and wherein the lithium can be present as either a single lithium atom, or multiple such that $x$ is an integer of 1 to 4, although preferably 1 to 3.

The amount of initiator employed varies widely depending on the type of polymer desired, the polymerizable monomers employed, their purity, and the like, as well as the final molecular weight desired for the polymer prior to coupling. A range of about 0.2 to 100 millimoles of initiator per 100 grams of monomer is a suitable exemplary range for most polymerizations.

Polymerization conditions such as temperature, pressure, and time, are those employed in the art for polymerization of the polymerizable monomers described. Pressures employed expediently are those sufficient to maintain the polymerization mixture substantially in the liquid phase. Polymerization temperatures can range widely, and an exemplary temperature range would lie between about −100 and +150° C., more usually between −75 and +75° C. Polymerization times can range from a few minutes to upwards of 48 hours or more as may be desired or convenient for commercial practices. Solvents can be and usually are employed including aliphatic hydrocarbons such as n-hexane, n-octane, n-dodecane, isooctane, or aromatics such as toluene, benzene, or cycloaliphatic hydrocarbons such as cyclohexane, and the like, and mixtures, generally of 4 to 12 carbon atoms per molecule for convenience and availability. Copolymerizations can be carried out in the presence of compounds known to be randomizers, such as polar compounds of ethers, tertiary amines, and the like.

COUPLING PROCEDURE

In practicing the process of our invention, the coupling adjuvant, butadiene, is added to the polyisoprene-lithium polymerization system after polymerization of the isoprene monomer, and prior to addition of the silicon-based coupling agent. The conditions for such addition can be those of the polymerization procedure itself as to temperature and pressure, although it presently is preferred to add the coupling adjuvant at a somewhat more moderate and lower temperature in order to provide a slower reaction as we believe that this minimizes butadiene-block formation thus promoting more even distribution of the adjuvant among the polyisoprene-lithium molecules.

The amount of coupling adjuvant employed presently is preferred to be in the range of at least one mole of butadiene for each equivalent of lithium or other alkali metal employed in the initiator. A small excess often can be employed, although as a working broad range we prefer not less than about 0.5 moles of butadiene, up to about 20, more preferably 0.5 to 10, more usually 1 to 10, most preferably near 1, moles of butadiene per equivalent of lithium present in the polymerization.

COUPLING AGENTS

The silicon-based coupling agents used in the process of our invention contain at least two reactive groups for coupling purposes. These compounds include substituted silanes and siloxanes, either open chain or cyclic.

The substituted silanes can be represented by $$Si_aR_bX_c$$

in which each R is hydrogen or an alkyl, cycloalkyl, or aryl radical, or combination thereof, containing 1 to 20 carbon atoms, such that the total number of carbon atoms per molecule can range up to 30; X is halogen, —OR, —NR$_2$, or —SR, and where halogen can be fluorine, chlorine, bromine, or iodine; $a$ is an integer of 1 to 8; $b$ is an integer equal to $(2a+2)-c$; and $c$ is an integer equal to 2 to $(2a+2)$. Corresponding cyclic silanes can be employed in which the value of $b$ becomes $2a-c$ and the value of $c$ ranges from 2 to $2a$.

The open-chain siloxanes can be represented by $$(SiO)_dR_eX_f$$

in which R and X are as described above; $d$ is an integer of 2 to 12; $e$ is an integer equal to $(2d+2)-f$; and $f$ is an integer equal to 2 to $(2d+2)$. Corresponding cyclic siloxanes can be employed in which the value of $d$ is an integer equal to 3 to 6; $e$ is an integer equal to $2d-f$ and the value of $f$ ranges from 2 to $2d$. Thus the open-chain siloxanes contain 2 to 12 silicon atoms and the cyclic siloxanes contain 3 to 6 silicon atoms per molecule.

The total number of carbon atoms per molecule can range up to 0 to 30.

Examples of suitable silicic compounds include the following:

silicon tetrachloride, silicon tetrabromide, methyltrichlorosilane, hexachlorodisilane, trifluorosilane, difluoro(dimethyl)silane, diiodo(didodecyl)silane, phenyl(tri-n-butoxy)silane, tetradodecoxysilane(dodecyl orthosilicate), phenyl-tri(phenylmercapto)silane, methyl-tri(methylamino)silane, hexamethoxydisiloxane, [1,1,5,5,9,9-hexa(ethoxy)-1,9-diethyl]pentasiloxane, 3,5-dichlorotetrasiloxane, octabromocyclotetrasiloxane, 1,1,5,5,9,9,-hexachlorocyclohexasiloxane, and the like.

The amount of coupling agent which can be employed according to the process of our invention can range widely depending on the particular species employed and reaction conditions. In terms of the ratio of equivalents of X in the coupling agent to alkali metal in the initiator employed, a broad ratio of equivalence for most purposes of X in the coupling agent to lithium in the initiator would be about 0.01:1 to 2.5:1, preferably 1:1 to 1.5:1 to achieve maximum coupling. It is to be noted that maximum coupling is not always desired. It should thus be recognized that while the process of the instant invention promotes the efficiency of the coupling reaction, the use of the instant invention is not limited to achieving maximum coupling and also can be employed when lesser degrees of coupling are intended, e.g., to afford minor reductions in cold flow.

The coupling agent is added in the process of our invention at the end of polymerization and after the addition of the butadiene coupling adjuvant. The coupling agent then is added, preferably with rapid stirring. It can be added in solution or dispersion in an inert agent, e.g., cyclohexane. An inert atmosphere, e.g., nitrogen, is employed.

Thereafter, the so-prepared or coupled polymer is recovered by conventional means, e.g., through the addition of an alcohol to cause precipitation of the rubber followed by filtration or decantation, washing and drying.

EXAMPLES

Examples are provided to further illustrate the nature and scope of our invention without the intent to limit our invention, but only to assist the practitioner of our invention as well as those skilled in the art to a further and more complete understanding of our invention. Specific materials employed, ratios, conditions, are intended to be further illustrative, and not limitative of our invention.

Example I

A series of runs was made using the following recipe.

Recipe

| | |
|---|---|
| Cyclohexane, phm.[1] | 624. |
| Isoprene, phm. | 100. |
| Tetrahydrofuran, phm. | 0.088. |
| n-Butyllithium, mhm.[2] | Variable. |
| Methyltrichlorosilane, mhm. | Do. |
| Hexachlorodisilane, mhm. | Do. |

[1] Parts by weight per hundred parts monomer.
[2] Gram millimoles per hundred grams monomer.

After charging the solvent and purging with nitrogen for 3 minutes, the monomer, tetrahydrofuran, and initiator were charged. The polymerizations were carried out at 70° C. for 1 hour followed by addition of the coupling agent and then addition of an antioxidant 5 ml. of a 10% solution of 2,6-di-tert-butyl-4-methylphenol in 2-propanol/toluene. The results are shown in Table I.

TABLE I

| Run number | 1 | 2 | 3 | 4 | 5 | 6 |
|---|---|---|---|---|---|---|
| n-BuLi, mhm | 1 | 3 | 6 | 0.33 | 1 | 2 |
| MeSiCl$_3$, mhm | 0 | 1 | 0 | 0 | 0.33 | 0 |
| Si$_2$Cl$_6$, mhm | 0 | 0 | 1 | 0 | 0 | 0.33 |
| HI$^a$ | 1.52 | 1.27 | 1.52 | 1.13 | 1.29 | 1.62 |
| M$_w$×10$^{-3b}$ | 207 | 65 | 35 | 192 | 143 | 146 |
| M$_n$×10$^{-3c}$ | 133 | 51 | 23 | 170 | 111 | 90 |
| I.V. in THF$^d$ | 1.49 | 0.54 | 0.32 | 1.46 | 1.07 | 0.89 |
| Gel, percent$^e$ | 0 | 0 | 0 | 0 | 0 | 0 |

$^a$ Heterogeneity Index is the quotient M$_w$/M$_n$.
$^b$ Weight average molecular weight determined through gel permeation chromatography by the method of G. Kraus and C. J. Stacy, *10 J. Poly. Sci. A2*, 657 (1972).
$^c$ Number average molecular weight determined by the method of the reference of footnote b.
$^d$ Inherent viscosity determined in tetrahydrofuran by the method of U.S. 3,278,508 column 20, note a.
$^e$ Determined by the method of U.S. 3,278,508 column 20, note b.

In the sequences of Runs 1 to 3 and 4 to 6, increasing initiator levels were matched by corresponding increases in the functionality of the coupling agent. If effective coupling occurred, the molecular weight of the resulting polymers would be essentially equal. Clearly, however, the decline in molecular weight essentially paralleled the increase in initiator level thus indicating very little coupling took place.

Further runs were made, Runs 7 to 12, repeating the methods and procedure of Runs 1 to 6 with but one modification, approximately 1.2 parts by weight of butadiene were added after the addition of the coupling agent. Gel permeation chromatography indicated the absence of any significant degree of coupling. These runs illustrate the necessity to add the coupling adjuvant prior to addition of the coupling agent.

Example II

In another series of runs, butadiene was added according to the process of our invention. The butadiene was added after the polymerization of the isoprene but prior to the addition of the coupling agent.

Recipe

| | |
|---|---|
| Cyclohexane, phm. | 624. |
| Isoprene, phm. | 100. |
| Tetrahydrofuran, phm. | 0.088. |
| n-Butyllithium, mhm. | Variable. |
| Butadiene, phm. | 1.2. |
| Methyltrichlorosilane, mhm. | Variable. |
| Hexachlorodisilane, mhm. | Do. |

For these runs, the procedures of Runs 1 to 6 were employed, except that after the one hour polymerization period at 70° C., the reaction mixture was allowed to cool for 15 minutes to reach 50° C. and then the butadiene was added. After 15 additional minutes at 50° C., the temperature was returned to 70° C. and the coupling agent was added followed by the antioxidant. The results are shown in Table II.

TABLE II

| Run number | 13 | 14 | 15 | 16 | 17 | 18 |
|---|---|---|---|---|---|---|
| n-BuLi, mhm | 1 | 3 | 6 | 0.33 | 1 | 2 |
| MeSiCl$_3$, mhm | 0 | 1 | 0 | 0 | 0.33 | 0 |
| Si$_2$Cl$_6$, mhm | 0 | 0 | 1 | 0 | 0 | 0.33 |
| M$_w$×10$^{-3}$ | 95 | 98 | 106 | 230 | 338 | 344 |
| M$_n$×10$^{-3}$ | 84 | 82 | 82 | 197 | 213 | 234 |
| HI | 1.13 | 1.19 | 1.29 | 1.17 | 1.59 | 1.47 |
| I.V. in THF | 0.84 | 0.70 | 0.53 | 1.63 | 1.99 | 1.05 |
| Gel, percent | 0 | 0 | 0 | 0 | 0 | 0 |

As in the sequences of Runs 1 to 3 and 4 to 6, increasing initiator levels were matched by corresponding increases in the functionality of the coupling agent in the Runs sequences 13 to 15 and 16 to 18. The relatively equal molecular weights of the resulting polymers within the sequences 13 to 15 and 16 to 18 indicate the effectiveness of coupling. Contrasting Runs 13 to 18 of the invention with control Runs 1 to 6 and 7 to 12 clearly illustrates the value and effectiveness of adding butadiene to polyisoprene-lithium prior to the addition of the coupling agent.

The rubbery polymers produced in accordance with this invention have wide utility in applications where synthetic and natural rubbers are used. Compounding ingredients such as fillers, dyes, pigments, and the like can be added by conventional means. The rubbery polymers can be employed for the preparation of manufactured items such as automobile tires, gaskets, containers, pipes and the like.

Certainly, reasonable variations and modifications of our invention are possible yet still within the scope of our disclosure and without departing from the intended scope and spirit thereof.

We claim:

1. In the process of coupling isoprene-alkali metal terminated polymer chains with silicon-based coupling agents, the improvement which comprises adding a minor amount of butadiene effective as a coupling adjuvant after polymerization and prior to addition of said silicon-based coupling agent,
    wherein said minor amount of butadiene is sufficient to provide up to about 20 mols butadiene per equivalent of alkali metal in said polymer.

2. The process according to claim 1 wherein said alkali metal in said organoalkali metal initiator is lithium, sodium, potassium, rubidium, or cesium.

3. The process according to claim 2 wherein said alkali metal is lithium, and said butadiene is employed in the range of 0.5 moles to 20 moles.

4. The process according to claim 3 wherein said silicon-based coupling agent is employed in a ratio of equivalence of coupling agent to alkali metal in the range of 0.01:1 to 2.5:1.

5. The process according to claim 2 wherein said coupling agent is an open-chain silane, cyclic silane, open-chain siloxane, or cyclic siloxane.

6. The process according to claim 5 wherein said coupling agent is said silane or said cyclic silane and is represented by

$$Si_aR_bX_c$$

wherein each R is hydrogen or alkyl, cycloalkyl, or combination aryl, radical, containing up to 20 carbon atoms per R group with the total number of carbon atoms per silane molecule being 0 to 30, and X is halogen, —OR, —NR$_2$, or SR, $a$ is an integer of 1 to 8, and when silane $b$ is an integer of $(2a+2)-c$, and $c$ is an integer of 2 to $(2a+2)$, and when cyclic silane $b=2a-c$ and $c$ ranges from 2 to $2a$.

7. The process according to claim 5 wherein said silicon-based coupling agent is said siloxane and is represented by

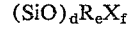

$$(SiO)_dR_eX_f$$

wherein each R is hydrogen or alkyl or aryl of up to 20 carbon atoms with the total number of carbon atoms per siloxane being 0 to 30, X is halogen, —OR, —NR$_2$, or —SR, $d$ is an integer of 2 to 12, $e$ is an integer of $(2d+2)-f$, and $f$ is an integer of 2 to $(2d+2)$.

8. The process according to claim 5 wherein said silicon-based coupling agent is said cyclic siloxane represented by the formula

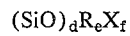

$$(SiO)_dR_eX_f$$

wherein R is hydrogen or alkyl or aryl of up to 20 carbon atoms with the total number of carbon atoms 0 to 30, X is halogen, —OR, —NR$_2$, or —SR, $d$ is an integer of 3 to 6, $e$ is an integer equal to $2d-f$ and $f$ is an integer of 2 to $2d$.

9. The process according to claim 5 wherein said isoprene lithium-terminated polymer is a polymer of at least one polymerizable conjugated diene, polymerizable monovinyl-substituted aromatic compound, or mixture, containing a final polyisoprene unit.

10. The process according to claim 9 wherein said polymerizable conjugated diene contains 4 to 12 carbon atoms per molecule, and said polymerizable monovinyl-substituted aromatic compound contains 8 to 20 carbon atoms per molecule.

11. The process according to claim 10 wherein said organoalkali metal initiator is represented by $RM_x$ wherein M is said alkali metal, and R is a hydrocarbyl radical of up to 20 carbon atoms, $x$ is an integer of 1 to 4.

12. The process according to claim 11 wherein said isoprenyllithium terminated polymer chain is the product of a polymerization conducted at $-100$ to $+150°$ C., in the presence of an inert hydrocarbon diluent, employing said organoalkali metal initiator in the ratio of 0.2 to 100 millimoles of initiator per 100 grams of monomer polymerized.

13. The process according to claim 12 wherein said organoalkali metal initiator is n-butyllithium, said silicon-based coupling agent is methyltrichlorosilane.

14. The process according to claim 12 wherein said organoalkali metal initiator is n-butyllithium, said silicon-based coupling agent is hexachlorodisilane.

15. The process according to claim 10 wherein said polymerizable conjugated diene is isoprene, 1,3-butadiene, 2,3-dimethyl-1,3-butadiene, piperylene, 3-butyl-1,3-octadiene, or 2-phenyl-1,3-butadiene; and
said polymerizable monovinyl-substituted aromatic compound is styrene, 1-vinylnaphthalene, 3-methylstyrene, 4-cyclohexylstyrene, 4-dodecylstyrene, 2-ethyl-4-benzylstyrene, 4-tert-butylstyrene, or 4-isopropylstyrene.

16. The process according to claim 11 wherein said organic alkali metal initiator is n-butyllithium, cyclohexyllithium, 4-cyclohexylbutyllithium, isopropyllithium, 4-phenylbutyllithium, 1,20-dilithioeicosane, or dilithionaphthalene.

17. The process according to claim 5 wherein said silicon-based coupling agent is silicon tetrachloride, silicon tetrabromide, methyltrichlorosilane, hexachlorodisilane, trifluorosilane, difluoro(dimethyl)silane, diiodo(didodecyl)silane, phenyl(tri - n-butoxy)silane, tetradodecoxysilane(dodecyl orthosilicate), phenyl - tri(phenylmercapto)silane, methyltri(methylamino)silane, hexamethoxydisiloxane, [1,1,5,5,9,9-hexa(ethoxy)1,9-diethyl]pentasiloxane, 3,5-dichlorotetrasiloxane, octabromocyclotetrasiloxane, or 1,1,5,5,9,9-hexachlorocyclohexasiloxane.

References Cited
UNITED STATES PATENTS

| | | | |
|---|---|---|---|
| 3,692,874 | 9/1972 | Farrar et al. | 260—880 B |
| 3,281,383 | 10/1966 | Zelinski et al. | 260—880 B |
| 3,468,972 | 9/1969 | Hsieh | 260—827 |

WILBERT J. BRIGGS, SR., Primary Examiner

U.S. Cl. X.R.

260—85.1, 94.2 M, 94.7 A, 94.7 HA, 94.7 S, 94.7 N, 879, 880 B